United States Patent
Andersson et al.

(10) Patent No.: US 10,309,319 B2
(45) Date of Patent: Jun. 4, 2019

(54) COMPRESSOR ARRANGEMENT AND GAS TURBINE ENGINE

(71) Applicant: Siemens Aktiengesellschaft, Munich (DE)

(72) Inventors: Mats Andersson, Norrköping (SE); Arturo Manrique Carrera, Finspong (SE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/762,704

(22) PCT Filed: Aug. 8, 2016

(86) PCT No.: PCT/EP2016/068846
§ 371 (c)(1),
(2) Date: Mar. 23, 2018

(87) PCT Pub. No.: WO2017/054971
PCT Pub. Date: Apr. 6, 2017

(65) Prior Publication Data
US 2018/0274451 A1  Sep. 27, 2018

(30) Foreign Application Priority Data

Sep. 30, 2015 (EP) .................................. 15187754

(51) Int. Cl.
*F02C 6/08* (2006.01)
*F02C 9/18* (2006.01)
(Continued)

(52) U.S. Cl.
CPC ................. *F02C 9/18* (2013.01); *F02C 6/08* (2013.01); *F02C 9/28* (2013.01); *F04D 19/02* (2013.01);
(Continued)

(58) Field of Classification Search
CPC ........... F04D 27/023; F05D 2220/3219; F05D 2270/3061; F02C 9/16; F02C 9/18; F02C 6/08
See application file for complete search history.

(56) References Cited

U.S. PATENT DOCUMENTS 2,731,798 A * 1/1956 Welsh ....................... F02C 1/05
60/39.465
2,837,270 A * 6/1958 Chapman ............ F04D 27/0215
415/145

(Continued)

FOREIGN PATENT DOCUMENTS

| DE | 3333437 A1 | 4/1985 |
|---|---|---|
| EP | 2853717 A1 | 4/2015 |
| WO | 2008123904 A2 | 10/2008 |

OTHER PUBLICATIONS

EP Search Report dated Mar. 31, 2016, for EP patent application No. 15187754.5.

(Continued)

*Primary Examiner* — Steven M Sutherland
*Assistant Examiner* — Thuyhang N Nguyen
(74) *Attorney, Agent, or Firm* — Busse Wolter Sanks & Maire

(57) ABSTRACT

A compressor arrangement has a main compressor section and boundary walls of a main fluid path through the main compressor section. The main compressor section is segmented into an upstream and downstream sub section, each with at least one row of blades and vanes arranged within the main fluid path. A transition piece is downstream of the rows of blades and has boundary walls of the main fluid path through the transition piece. The compressor arrangement has an annular cavity, an effusion opening connecting the downstream sub section or the transition piece and the cavity, at least one valve to control effusion of compressor (Continued)

fluid from the main fluid path into the cavity, and a passage connecting the cavity and the main compressor section to guide fluid located between the upstream and downstream sub section and located at least one row of blades and vanes upstream of the effusion opening.

14 Claims, 4 Drawing Sheets

(51) Int. Cl.
    *F02C 9/28*     (2006.01)
    *F04D 19/02*     (2006.01)
    *F04D 27/02*     (2006.01)
    *F04D 29/56*     (2006.01)

(52) U.S. Cl.
    CPC ....... *F04D 27/023* (2013.01); *F04D 27/0207* (2013.01); *F04D 29/563* (2013.01); *F05D 2220/32* (2013.01); *F05D 2270/08* (2013.01); *F05D 2270/303* (2013.01)

(56) References Cited

U.S. PATENT DOCUMENTS

| | | | |
|---|---|---|---|
| 7,540,144 B2 * | 6/2009 | Makuszewski | F02C 9/18 |
| | | | 60/226.1 |
| 7,967,556 B2 * | 6/2011 | Gummer | F04D 27/0215 |
| | | | 415/144 |
| 9,322,337 B2 * | 4/2016 | Little | F02C 9/18 |

OTHER PUBLICATIONS

International Search Report dated Oct. 21, 2016, for PCT/EP2016/068846.

* cited by examiner

COMPRESSOR ARRANGEMENT AND GAS TURBINE ENGINE

CROSS REFERENCE TO RELATED APPLICATIONS

This application is the US National Stage of International Application No. PCT/EP2016/068846 filed 8 Aug. 2016, and claims the benefit thereof. The International Application claims the benefit of European Application No. EP15187754 filed 30 Sep. 2015. All of the applications are incorporated by reference herein in their entirety.

FIELD OF THE INVENTION

The invention relates to a compressor arrangement, i.e. a sub section of a gas turbine engine, allowing reinjection of diverted main fluid back into the main fluid path at a location in a compressor section. Furthermore the invention relates to a gas turbine engine.

BACKGROUND OF THE INVENTION

Gas turbine engines like other rotating machines or turbomachines are required to operate at a range of modes of operation. Particularly there may be the need to operate a gas turbine engine on a broad range of loads. Additionally there may be the need to operate a gas turbine engine on different levels of ambient temperature. Furthermore there may be requirement to fulfill emission demands for all different modes of operation.

In the gas turbine engine typically ambient air as a fairly cool fluid may be compressed by a compressor—e.g. a compressor section of a gas turbine—and provided to a combustor in which the still substantially cool fluid (the temperature may be several hundred degree Celsius at a discharge of the compressor section but at least drastically cooler than the working conditions within the combustor of the gas turbine engine) will react together with fuel to provide a driving force for a subsequent turbine section in which a hot and pressurised fluid from the combustor will drive rotor blades of the turbine to drive again a shaft. The shaft may again drive blades of the compressor section to perform the compression of the ambient air and the excess power will drive an electric generator or a rotating load attached to the shaft of the gas turbine engine.

In the combustor or in the downstream sections past the combustor high temperatures can occur on components that are guiding the hot fluid through the gas turbine engine. The temperatures can be up to 1,500° C. or even higher. High combustion temperatures may be advantageous in respect of emissions, e.g. carbon monoxide (chemical symbol: CO) and unburned hydrocarbon emissions.

Furthermore it has to be noted, even though this may degrade the efficiency of the compressor, it is known that not all of the compressed air may be used for combustion. A part of the air may be used in some other different ways, like de-icing at the compressor entry or the inlet of the gas turbine engine, or turbine blade cooling or cooling of other components. Therefore, compressed air is taken from within the engine, typically in or after the compressor stage(s), depending on the application. This deviated compressed air is typically called bleed air and is typically not provided to the burners for combustion.

There may also be reasons to extract air from the compressor and guide this directly to the exhaust of the gas turbine engine. Even though this is a planned measure, this leads to a reduced overall efficiency. Furthermore, potentially extraction of air can produce an unbalance in the compressor flow that could induce compressor instabilities—like compressor surge, stall—or engine instabilities e.g. uneven engine temperature, flame flash back in burners.

It has to be noted that as a general aim typically in gas turbine design it is aimed for lean combustion at full load with supply of as little fuel as possible, particularly to reduce the expenditure for fuel. The lean combustion may typically be configured and optimised for full load operation.

It may be problematic to run the gas turbine engine in continuous low load operation as low load operation is typically far from optimal design conditions. For transient low load operation it may not be a problem to exceed emission legislation for a short time, but for continuous low load operation given emission requirements should be met.

It is an aim to provide a solution to extend the range of modes of operations in which emission requirements are sufficiently fulfilled.

One option to operate a gas turbine engine in part load mode with reduced CO emission can be found in WO 2008/123904 A2. Pipes are present to bleed compressor air to the atmosphere, to an exhaust, or to an inlet.

SUMMARY OF THE INVENTION

The present invention seeks to provide a solution to extend the range of modes of operations of a gas turbine engine without substantial negative effects related to emissions.

This objective is achieved by the independent claims. The dependent claims describe advantageous developments and modifications of the invention.

In accordance with the invention there is provided a compressor arrangement—i.e. a sub-component of a gas turbine engine—comprising a main compressor section, a transition piece, and an annular cavity. The main compressor section—particularly a turbocompressor or an axial compressor—comprises boundary walls of a main fluid path through the main compressor section, the main compressor section comprising a plurality of rows of blades and a plurality of rows of vanes and being segmented into an upstream sub section and a downstream sub section, each comprising at least one row of blades and at least one row of vanes arranged within the main fluid path. The main compressor section is particularly an integral part of the gas turbine engine. The transition piece is located downstream of the plurality of rows of blades of the main compressor section—i.e. the transition piece does not comprise blades and advantageously also no vanes—, the transition piece comprising further boundary walls of the main fluid path through the transition piece. That means that the further boundary walls of the transition piece will guide the main fluid as provided from the main compressor section. The mentioned cavity advantageously is not part of the main fluid path and advantageously is radially surrounding the main fluid path. Furthermore the cavity is an annular cavity. The compressor arrangement and specifically the main compressor section comprise an effusion opening connecting the downstream sub section or the transition piece and the annular cavity. The compressor arrangement further comprises at least one valve to control effusion of compressor fluid from the main fluid path—i.e. from the transition piece or from the downstream sub section—into the cavity via the effusion opening during operation, i.e. a through-flow of fluid via a passage defined by the valve is controlled and/or biased, e.g. potentially even completely closed. Besides, the compressor arrangement comprises a passage connecting the cavity and the main compressor section to guide fluid between the cavity and the main fluid path of the main compressor section during operation, wherein the passage is located between the upstream sub section and the downstream sub section and located at least one row of blades and at least one row of vanes upstream of the effusion opening.

Typically, "bleed air" produced by gas turbine engines is compressed air that is diverted from the main compressor section of those engines so that the bleed air leaves the main fluid path.

That means, in an embodiment, the compressor arrangement further comprises a bleed valve arranged in a bleed duct which diverts from the cavity. The passage, in a closed position of the at least one valve and an open position of the bleed valve, may provide a flow of fluid from the main fluid path into the cavity during a normal mode of operation. Furthermore the passage, in a closed position of the at least one valve and a closed position of the bleed valve, may provide no flow of fluid during a additional mode of operation. Note that the additional mode of operation may be identical to a third mode of operation introduced below.

The invention therefore allows redirecting a fraction of the main fluid—i.e. the compressed air—from the transition piece—in this case called compressor discharge fluid—or from the downstream sub section back into the fluid path at a mid section of the main compressor section. As the temperature of the main fluid at the transition piece is elevated, this fluid of elevated temperature is injected into the fluid path into the main fluid of a lower temperature, increasing the overall temperature of the main fluid past the mixing point, i.e. downstream of the passage. Thus, the temperature of the main fluid at the transition piece rises over time. Then again a fraction of the main fluid is redirected and the remainder—a main fraction—of the main fluid is provided to a combustor downstream of the transition piece. Due to this continuous redirected—or recirculated—fluid stream, the overall temperature of the main fluid at the transition piece and specifically of the fluid provided to the combustor increases. The redistribution of airflow in the compressor creates a new balance point for the gas turbine with changed rotor speed and with perhaps reduced efficiency and increased fuel consumption which consequently increases flame temperature and improves burnout.

Besides the effect of the temperature, also the mass flow decreases over time such that particularly less air—also less oxygen—is delivered to the combustors. The reason is mainly the new balance point with changed rotor speed. Additionally first a volume fraction is diverted and not provided to the combustors. Besides, the main fluid of increased temperature carries per se less oxygen and has a lesser mass flow.

As a consequence, assuming the fuel supply remains constant for the combustor, ratio of fuel-to-air increases in the combustion zone. The mixture gets richer. As a consequence the combustion temperature increases, even for a part load operation of the gas turbine engine.

As said, the main fraction—of that main fluid of elevated temperature—is provided from the transition piece to a downstream combustor. The increased temperature—compared to the main fluid without activated recirculation—leads to a higher combustion temperature—due to higher temperature of the compressor discharge and due to a higher fuel content in the fuel-to-air ratio—, which in consequence allows also improved—i.e. more stable—operation at part load or at low ambient temperatures and still meeting emission demands. "Waste" heat is kept within the process as there is no bleed to an engine exhaust or the ambient surroundings.

Note that the main fluid is typically ambient air that is provided from a gas turbine inlet to the compressor—particularly the main compressor section—, and further via the transition piece to the combustor.

The pressure of the main fluid at the transition piece or at the downstream sub section is typically higher than the pressure at any further upstream stage within the main compressor section. Therefore, when the valve is opened, a fraction of the main fluid will flow automatically into the cavity and later via the passage back into the main fluid path of the main compressor section, just due to the experienced pressure differences.

As the cavity is annular, extraction of compressor fluid and/or distribution of the extracted compressor fluid will be more evenly.

The annular cavity is advantageously surrounding the boundary walls of the main compressor section or the transition piece such that sections of the boundary walls form also walls of the cavity. Therefore no external piping is required.

Advantageously this mode of operation can be activated, deactivated and/or controlled via the mentioned valve. The passage, in an opened position of the at least one valve, may provide a flow of fluid from the cavity into the main fluid path during a first mode of operation.

During a second mode of operation, the passage, in a closed position of the at least one valve, may provide no flow of fluid from the main fluid path into the cavity or the other way around.

Furthermore the passage, in a closed position of the at least one valve, may provide a flow of fluid from the main fluid path into the cavity during a third mode of operation, particularly dependent upon further conditions, like the presence and configuration of a bleed valve.

Advantageously the cavity is also used as a bleed cavity and the mentioned passage is also used as a bleed passage. "Bleed" means in this respect the transfer of a fraction of the main fluid from the main compressor section into the bleed cavity and possibly further to a gas turbine inlet and/or to an exhaust of the gas turbine engine. Thus, the passage according to the invention may also transport bleed fluid—depending on valve settings and pressure differences—in opposite direction as mentioned originally.

The passage is advantageously an annular passage or annular slot or an annular opening. The passage is advantageously located in the boundary wall of the main compressor section or the transition piece.

The main compressor section may have several stages of rows of blades and rows of vanes. A first row of blades or a number of rows of blades—e.g. three, four, or five—could be variable guide vanes and could be adjusted in position based on the mode of operation. Furthermore, the variable guide vanes may be followed by a plurality of rows of fixed oriented blades, e.g. three, four, five, six, or seven rows.

The position of the passage for reinjection of fluid into the main fluid path is between the mentioned upstream sub section and the downstream sub section. The upstream sub section may comprise all variable guide vanes. Alternatively the upstream sub section may comprise three, four, five, or even more rows of blades. The downstream sub section may comprise all fixed guide vanes. Alternatively the downstream sub section may comprise three, four, five, or even more rows of blades.

Advantageously the downstream sub section is the aft or trailing section of the compressor. The downstream sub section includes the—in flow direction—last stage of the compressor.

The position of the passage for reinjection of fluid into the main fluid path could also be dependent on the presence of further bleed cavities. The cavity according to the invention possibly cannot consume space that is needed for further bleed cavities. These further cavities may be needed for different reasons. One bleed cavity may be needed to extract air to be used for cooling of different components. Another bleed cavity may be used to support start-up of the engine.

Also combinations of uses of cavities are possible i.e. both extraction for cooling and extraction for start-up purposes and also for purposes as previously mentioned.

In an embodiment the passage between the main fluid path and the cavity is an annular passage. It could be considered to be an annular slot. Alternatively—possibly less advantageous—the passage may comprise a plurality of distinct circumferential openings.

The cavity may be surrounded radially by a casing—a compressor external housing or a main housing of the gas turbine engine. Sections of the casing may define a radial outer wall of the cavity. The casing may provide an external opening to the cavity, particularly to allow bleeding to external piping. The cavity may be defined radially outwards—as seen from a central axis through the compressor—by the casing and radially inwards by a back face of an outward boundary wall of the main compressor section and/or of the transition piece. Thus, as being inside of the main housing, the cavity can be considered to be an internal cavity. In theory it may also be connected via piping outside of the casing, though, even though this may be more complex.

According to an embodiment a distinct number of valves may be provided to control effusion of compressor fluid from the transition piece or the downstream sub section into the cavity during operation. Advantageously four, five, or six valves may be present. Advantageously these values may be positioned equidistantly around the circumference of the transition piece or of the downstream sub section.

Alternatively a movable throttling ring could be used as a valve to open or close an elongated or circumferential gap to control effusion of compressor fluid from the transition piece or the downstream sub section into the cavity during operation.

In another embodiment the opening between the transition piece (or the downstream sub section) into the cavity is in form of a single hole, controlled by a single valve. A plurality of holes and valves may be present, though.

One of the at least one valve may comprise a first actuator, a conical section that can be longitudinally adjusted by the first actuator, and a substantially cylindrical and/or conical opening for guiding fluid through the opening, wherein the conical section, if longitudinally adjusted by the first actuator, can close, restrict or open a fluid passage between the conical section and the corresponding opening during operation.

The actuator may advantageously be a lever. The cylindrical or conical opening may be advantageously a sleeve, though which a fluid can pass.

The sleeve may advantageously have an outer conical end. This may be advantageous if the (inner) conical section will match perfectly so that the opening can be closed completely.

The opening may also have also a different, more complex, shape. The shape of the opening may then advantageously just correspond to the shape of the other section to open or close the opening.

Another way of having a valve between the transition piece (or the downstream sub section) into the cavity is that one of the at least one valve may comprise a second actuator, a flap that can be turned by the second actuator, and an opening for guiding fluid through the opening, wherein the flap can close or open a fluid passage between the flap and the opening during operation.

The flap may have a form of a truncated cone. The opening may have a corresponding shape, matching the truncated cone of the flap. For turning the flap—i.e. to swing open and to close—e.g. a set of levers may be arranged in combination with pivot points or hinges, so that the flap can turn about a hinge to open or close.

The valve may have an open position, a close position, and a number of or continuous intermediate positions for throttling the through-flow.

If this "recirculation" feature should be applied to an existing gas turbine engine, the actuator may be installed in a probe opening of the gas turbine engine provided for temporary installation of a probe. The probe may be a temperature or pressure measurement probe.

The branch-off from the transition piece into the cavity may occur directly from the main flow path of the transition piece. Thus, one of the at least one valve may be positioned at the further boundary walls of the main fluid path of the transition piece.

Alternatively, one of the at least one valve may be positioned at a wall of a side branch chamber connected to the main fluid path. The side branch chamber may be an annular chamber located between the main fluid path and the cavity as introduced before.

A fluidic connection between the side branch chamber and the main fluid path may be provided via a flow equalizer plate, which may be cylindrical, conical or in form of a ring plate, depending of the orientation of the flow equalizer.

The flow equalizer may have a plurality of through holes which allow passage of main fluid but disallow abrupt passage of a large quantity of main fluid. Thus the fluid flow of main fluid into the side branch is equalised.

The extraction via a side branch chamber and/or via a flow equalizer may also allow even flow extraction around the compressor circumference, particularly around the main compressor section.

The compressor arrangement may further comprise a control entity. The control entity being adapted to perform at least the following steps during operation:—measuring a combustion temperature or a physical parameter indicative for the combustion temperature (in this respect "indicative" means one or a set of measurements allowing the combustion temperature to be calculated or to be derived);—comparing the measured combustion temperature or the mentioned physical parameter with a lower threshold value and opening the at least one valve if the measured combustion temperature is below the lower threshold value; and/or—comparing the measured combustion temperature or the mentioned physical parameter with an upper threshold value and closing the at least one valve if the measured combustion temperature is above the upper threshold value.

Optionally continuous operation may be possible such that the control entity provides correction values for the valve setting depending on the level of load.

Thus the valve and possibly also the optionally available bleed valve may be operated based on the operation and/or ambient conditions. E.g. the control may be in response of a load information (i.e. data specifying the load) and/or an ambient temperature information (data specifying the ambient temperature) and/or a combustion temperature information (data specifying the combustion temperature).

The combustion temperature information may not be gathered directly, but derived from another parameter that is directly related to the combustion temperature, e.g. the turbine inlet temperature, the exhaust temperature, or possibly even parameters like combustion dynamics. Also the driven load or torque at the shaft may be indicative of the combustion temperature.

The invention may also be related to a control method to operate the valve.

Furthermore the invention is also related to a gas turbine engine that comprises a compressor arrangement as defined in the previous paragraphs.

The branching off of main fluid from the downstream sub section—i.e. from the main compressor section—may be called bleeding. The extracted main fluid may be called bleed air. If branched off from the transition piece—i.e. downstream of all compressor blades—the term bleeding may be less common but may be used in the context of this invention.

The invention may be advantageous as the valves will connect a high pressure region (e.g. at the transition piece) with the cavity, hence inducing an internal flow recirculation which will reduce the overall air flow into a combustor settling chamber, that again will provide the main fluid to the combustor for fuel combustion with the provided main fluid. Furthermore such a branched off fluidflow possibly will be evenly distributed around the compressor in the cavity.

Embodiments of the invention may be advantageous as to provide an even flow extraction around the compressor circumference. Control of the leakage flow of the compressor can be controlled assuming the existence of leakage flow into the cavity via existing joints. Space for valves for bleed control may be reduced if no external piping and external valves are needed.

Compared to bleeding to the outlet or exhaust of the gas turbine engine in which hot air is "wasted", there may be a reduced efficiency loss. Waste heat is kept within the process and is even actively used to raise the overall compressor discharge temperature.

Possibly, if several bleed valves are used in an existing gas turbine engine, one of the bleed valves may possibly not be needed anymore so that a complex external bleed piping can be reduced.

With the invention emission demands on extended load interval—i.e. operation at even lower loads, e.g. less than 60% or less than 50% of the target load—and extended ambient temperature range—i.e. operation at colder ambient conditions—could be achieved by increasing the combustion temperature in the combustion chamber. In order to increase the combustion temperature the fuel to air ratio may be increased. This can be achieved by internal compressor re-circulation of branched off compressor fluid guided internally through a provided internal valve system.

The invention is particularly not directed to compressor startup. The invention is mainly directed to normal steady mode of operation but would also work for transient operation. Even though the invention is aimed for steady or continuous operation, it allows operation at lower loads, e.g. between 45% and 60% of full load which otherwise would exceed emission requirements.

It has also to be noted that internal cavities are advantageously used and not external piping, which would cause a lot of effort to assemble.

The invention is also directed to the use of a compressor arrangement as defined above to reduce emissions in non-transient low load conditions. For this, the at least one valve is controlled to adapt effusion of compressor fluid from the main fluid path into the cavity via the effusion opening. This generates the above mentioned advantages. In this configuration a further bleed valve may be shut so that all air recirculates.

Additionally the invention can also be directed to the use of a compressor that fulfils two tasks simultaneously, first the reduction of emissions in non-transient low load conditions and second the provision of cooling air for other components (like a combustor). In this configuration the at least one valve and also a further bleed valve may be opened so that only a part of the extracted air recirculates and the other part is bleed air to be provided to the other components.

Another aspect is that in principle you can bleed full pressure air from a low pressure cavity with limited extra equipment and limited impact on gas turbine casings.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

Besides, the invention may also be directed to a stand-alone compressor, particularly an axial or turbo compressor. It may be connected to a combustor to which the main fluid is provided. Nevertheless the main application of the invention may be an integral gas turbine engine which houses a compressor, a combustor and a turbine in one common module.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which.

The illustration in the drawing is schematical. It is noted that for similar or identical elements in different figures, the same reference signs will be used.

Figure 1:
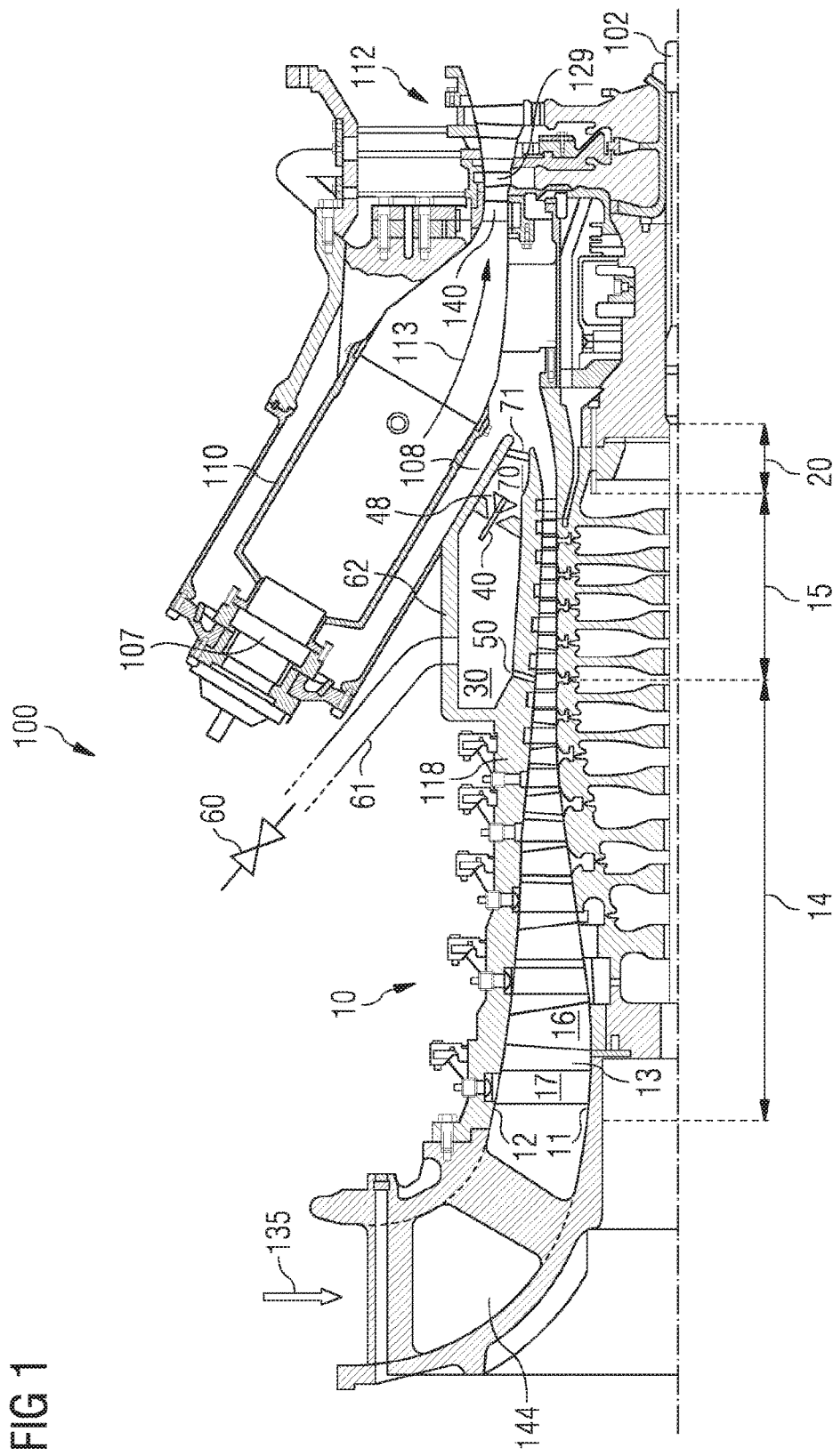
FIG. 1: shows schematically of a cross section of an exemplary compressor arrangement.

Some of the features and especially the advantages will be explained for an assembled and operating gas turbine, but obviously the features can be applied also to the single components of the gas turbine or even other turbo machines but may show the advantages only once assembled and during operation. But when explained by means of a gas turbine during operation none of the details should be limited to a gas turbine while in operation.

DETAILED DESCRIPTION OF THE INVENTION

To explain briefly the way of operating a gas turbine engine, a gas turbine—short for gas-turbine engine—comprises an air inlet at one axial end followed by a compressor in which incoming air is compressed for application to one or more combustors, which may be annular, so-called can-annular or silo type, the can-annular type being distributed circumferentially around a turbine axis. Fuel is introduced into the combustors and therein mixed with a major part of the compressed air taken from the compressor. Hot gases with high velocity as a consequence of combustion in the combustors are directed to a set of turbine blades within a turbine section, being guided (i.e. redirected) by a set of guide vanes. The turbine blades and a shaft—the turbine blades being fixed to that shaft—form a part of the rotor and are rotated about the axis as a result of the impact of the flow of the hot gases. That rotating rotor (or another connected rotor) also rotates blades of the compressor, so that the compressed air supply to the combustors is generated by the rotor blades of the compressor (i.e. by the used rotating blades interacting with static vanes) once in operation. There may be more than one rotor and/or more than one rotor shaft in the gas turbine engine. Past the turbine section, at a second axial end of the gas turbine and downstream of the turbine section, the combusted gas will be guided to an exhaust of the gas turbine via which it will be released in to the ambient air or guided to a further component, like a steam boiler or a steam turbine. The exhausted gas may contain also combustion emissions, like CO.

In the following we will identify the ambient air that is guided from the air inlet, via the compressor and to the combustor as "fluid" or "main fluid", guided through the mentioned components via a main fluid path 13, which is an annular path via which the main fluid is delivered and in which the physical properties of the main fluid will be changed.

Note that in the following a location of one component in relation to a second one is made in respect of a flow direction of a fluid, usually the main fluid. The term "upstream" defines a position that the fluid passes earlier than the "downstream" position. That means an upstream end of a compressor is the section at which air enters the compressor from the inlet of the gas turbine. A downstream end defines the position at which the air is discharged from the compressor. The direction from an upstream end of the compressor to a downstream end of the compressor also is defined as (positive) axial direction. A direction perpendicular to a rotational axis of the gas turbine engine is called radial direction. Furthermore a direction given from a location on a cylindrical surface may comprise an axial vector component, a radial vector component and a circumferential vector component, all three components being perpendicular to another. Thus, a circumferential direction is the direction lateral to a cylindrical surface or lateral to an annular cavity.

In FIG. 1 a section of a simplified gas turbine engine is shown in a cross sectional view. Particularly a compressor arrangement 100 is depicted, followed by a combustor 110. The combustor is in this example of a can-annular type but can also be annular. The combustor may also comprise a burner 107 and a combustion chamber (which is also represented by the reference numeral 110). Via the burner 107 fuel is provided. The fuel and air is mixed and combusted in the combustion chamber. The air is the fluid—the main fluid—provided from the compressor arrangement 100. The combustion generated a combusted fluid 113 which is directed to a turbine section 112, which includes at least one row of turbine vanes 140 and at least one row of turbine blades 129.

The row of turbine blades 129 is attached to a gas turbine shaft 102. The gas turbine shaft 102 also drives a plurality of rows of blades 16 of the compressor arrangement 100.

The compressor arrangement 100 comprises a main compressor section 10 defining a main fluid 13 path through the compressor arrangement 100. The main fluid path 13 is an annular passage through compressor through which the working fluid—typically air taken from the ambient—is guided. The main compressor section 10 comprises boundary walls—inner boundary wall 11 and outer boundary wall 12, inner and outer in respect of a radial direction—of the main fluid path 13 through the main compressor section 10. The main compressor section 10 comprises mentioned plurality of rows of blades 16 and a plurality of rows of vanes 17. Furthermore the main compressor section 10 can be segmented into an upstream sub section 14 and a downstream sub section 15, each comprising a at least a single row of blades 16 and at least a single row of vanes 17 arranged within the main fluid path 13. Advantageously more than one row of blades 16 and more than one row of vanes 17 are contained. "Upstream" is defined in respect of the major direction of the main fluid flow and defines again a region which delivers the main fluid earlier than a "downstream" end.

Air from a gas turbine inlet 144 is identified by an arrow as an ambient air supply 135, and is led to the upstream sub section 14 of the main compressor section 10.

During operation of the gas turbine engine, the rotating blades 16 of the compressor will provide a movement of the main fluid via the main fluid path 13 from and via the upstream sub section 14, via the downstream sub section 15 until a following transition piece 20. The transition piece 20 is located downstream of the plurality of rows of blades 16 of the main compressor section 10. The transition piece 20 comprises further boundary walls 21 (outer wall; see FIG. 2) and 22 (inner wall; see FIG. 2) of the main fluid path 13 through the transition piece 20. Stage by stage, the due to the interaction of the blades 16 and vanes 17, the main fluid is also compressed leading to a compressed fluid 41 (see FIG. 2) as compressor discharge at the transition piece 20.

Figure 2:
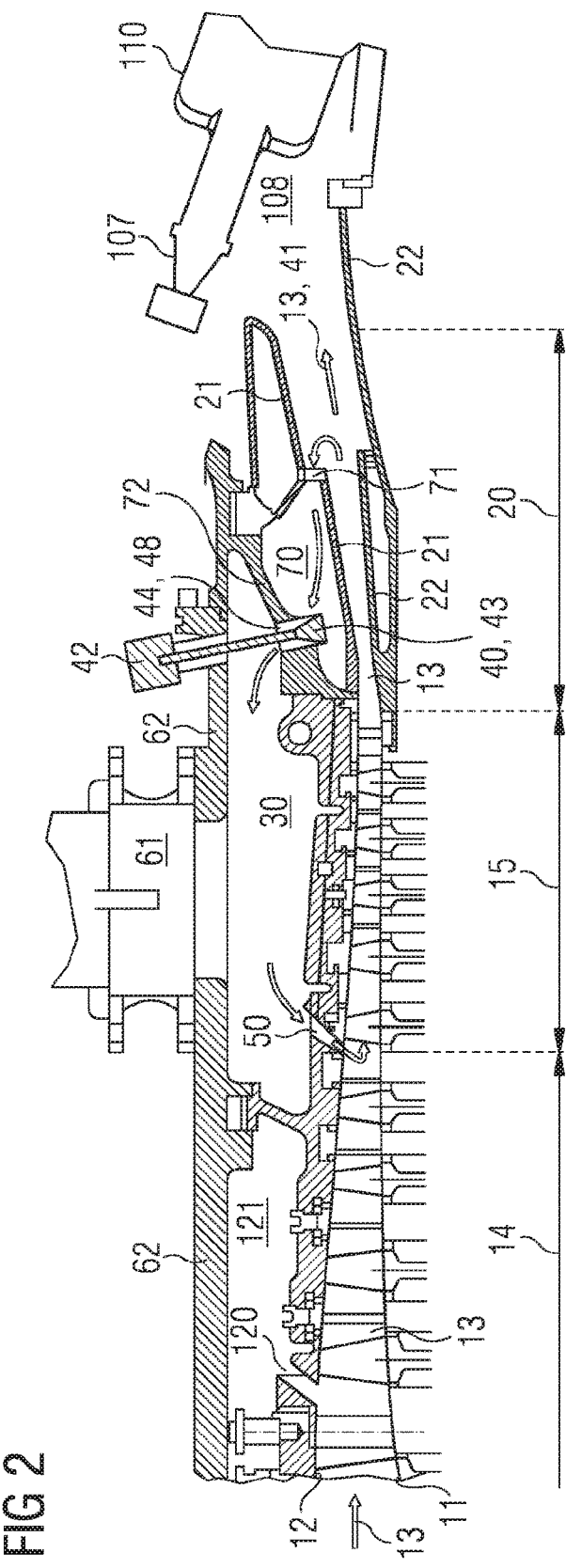
FIG. 2: shows a detailed view on an alternative implementation f a cross section of an exemplary compressor arrangement.

The main compressor section may have one or more bleed openings. In FIG. 1 only one bleed opening is shown as passage 50. Passage 50 is an annular slot through the outer boundary wall 12. The slot may be angled such that the passage 50 has a vector component in positive axial direction when evaluated from the most inner location of the passage 50. Further bleed openings may be present, one is indicated in FIG. 2 via reference numeral 120.

The outer boundary wall 12 also defines a wall or a casing 62 of the compressor. In that casing 62—or surrounded by a part of the casing 62—an annular cavity 30 may be present. Advantageously the cavity 30 is an internal component to the gas turbine engine casing, i.e. radial inwards of walls of the casing 62. According to FIG. 1 the casing of the gas turbine may be branched off, so that an outwards casing is provided and an inwards wall as boundary wall for the compressor main fluid path, "outwards" and "inwards" in respect of the radial direction. In between that outwards casing and the inwards wall the cavity 30 is enclosed.

Advantageously the cavity 30 is a closed cavity with three in- and/or outlet. One combined in- and outlet is the already mentioned passage 50 that connects the cavity 30 and the main compressor section 10 to guide fluid between the cavity 30 and the main fluid path 13 of the main compressor section 10 during operation. The passage 50 is located between the upstream sub section 14 and the downstream sub section 15. That means the passage 50 is not at the very front of the compressor at its inlet and also not at its very end at its outlet. The passage 50 is located advantageously between a plurality of upstream compressor blades and vanes (of the upstream sub section 14) and a plurality of downstream compressor blades and vanes.

The passage 50 pierces an inner casing wall. The cavity 30 furthermore has a bleed duct 61 that pierces an outer casing wall. The bleed duct 61 leads to a bleed valve 60 (abstractly shown in FIG. 1 just by a symbol). The bleed duct 61, the cavity 30 and the passage 50 commonly can act as a bleed in one mode of operation so that fluid is extracted via the passage 50 from the main fluid path 13, provided into the cavity 30, and further conveyed via the opened bleed valve 60 to a further location of the gas turbine engine.

The cavity 30 comprises an effusion opening 48 that can be located such that it can connect the downstream sub section 15 or the transition piece 20 and the cavity 30. According to the figures, the effusion opening 48 connects the transition piece 20 and the cavity 30. Furthermore at least one valve 40 is present to control effusion of compressor fluid 41 from the main fluid path 13—in the figures from the transition piece 20—into the cavity 30 via the effusion opening 48 during operation. Possibly several valves 40 may be positioned around the circumference of the compressor, e.g. 4 or 6 valves. That means also the number of effusion openings 48 are advantageously distinct, e.g. also 4 or 6. Advantageously the valves 40 and the effusion openings 48 are one common component so that one of the valves 40 is positioned in one of the effusion openings 48.

The valve 40 can completely be closed. Then the cavity 30 and the passage 50 can be used for bleeding, as mentioned before. Or the cavity 30 may completely be sealed, if the valve 40 and also the bleed valve 60 are both closed.

The passage 50 is located at least one row—possibly also two or three or four—of blades 16 and at least one row—possibly also two or three or four—of vanes 17 upstream of the effusion opening 48. "Upstream" in respect of the direction of the main fluid flow within the main fluid path 13. According to FIG. 2 the passage 50 is located 5 rows of blades 16 before the compressor discharge end.

When now the valve 40 is opened and bleed valve 60 is shut, then a recirculation of fluid is generated, as high pressure fluid is extracted from the transition piece 20, the fluid passing the effusions opening 48, lead into the cavity 30, and finally exhausted back into the main fluid path 13 via the passage 50. Thus the passage 50 can provide fluid flow in both directions depending on the pressure differences at a specific mode of operation.

Note that in FIG. 1, the extraction from the transition piece 20 is performed via a side branch chamber 70 that is connected to the main fluid path 13 at the transition piece 20 via a flow equalizer plate 71. The flow equalizer plate 71 is particularly an annular ring with a high number of through holes that allow the fluid to pass the flow equalizer plate 71 continuously with strong pressure drop. Thus, the remaining fluid flow—the main share of the fluid—in the transition piece 20 that is be provided to a combustor settling chamber 108, remains substantially steady with a continuous drop of fluid volume. The side branch chamber 70 may be an annular cavity that has one wall at which the effusion opening 48 is located.

The side branch chamber 70 has an annular opening—possibly with an installed flow equalizer plate 71—at a downstream end in respect of the fluid flow of the compressor fluid 41. Thus, the side branch chamber 70 is provided with compressor fluid 41 in reverse direction compared to a main fluid direction. By using a side branch chamber 70 the extraction of fluid can occur more evenly around the circumference of the compressor arrangement.

The flow equalizer plate 71 may be positioned that the main fluid may need to redirect its flow direction of substantially 180 degrees to be able to pass the holes of the flow equalizer plate 71.

The flow equalizer plate 71 also supports the extraction of fluid more evenly around the circumference of the compressor arrangement.

As said, a recirculation of main fluid can be generated via the side branch chamber 70, the effusion opening 48, the cavity 30 and the passage 50. By this, oxygen (chemical formula: $O_2$) is recirculated so that the volume and also the mass flow of the fluid to the combustor is reduced. Less $O_2$ is provided to the combustor. An additional effect is that hotter fluid extracted from the transition piece 20 is redirected via the passage 50 into a further upstream position in the main fluid path 13, in which cooler fluid travel. The cooler fluid is mixed with a hotter recirculated fluid leading to an overall increase of fluid temperature of the fluid in the main fluid path 13 past the passage 50, i.e. in the region of the downstream sub section 15. A higher temperature also reduces the mass flow of the fluid. Again, this results in less provided $O_2$ to the combustor.

Advantageously more than 0 and up to 20 vol % of the fluid may be extracted from the main fluid path 13 at the transition piece 20 to be used for recirculation.

In a lot of gas turbine engines the fuel supply to the combustor 110 may be controlled in a limited way. The $O_2$ supply on the other hand depends on the speed and/or torque of the rotor—i.e. gas turbine shaft 102—, and also of the ambient temperature of ambient air which is provided via the ambient air supply 135. High temperature ambient air can carry less mass flow, less $O_2$ molecules per volume.

A gas turbine engine is usually designed for a steady "full load operation". The combustor 110 and emissions from the combustors are optimised for full load operation. Without the invention, in steady part load operation, too much main fluid—i.e. too much $O_2$—may provided by the compressor to the combustor 110. In case of unchanged supply of fuel the ratio of fuel-to-air is reduced (i.e. more $O_2$ is present for the same amount of fuel), the flame temperature in the combustion chamber is reduced, thus leading to more emission of CO. The invention allows to increase the temperature of the main fluid and to have less $O_2$ provided to the combustor 110, thus leading to a higher fuel-to-air ratio and to a higher combustion temperature (as a consequence of the higher fuel-to-air ratio and the higher temperature of the main fluid). Thus, emissions will be lower when the inventive recirculation takes place. A further result of the inventive recirculation is that the gas turbine will also find a new balance point that will further increase the fuel-to-air ratio as the rotor can run at a different speed.

Part load operation is considered a mode of operation for steady operation, not startup or shutdown of the engine or transient operation. The invention may allow operation at 60%, 50% or even 40% of full load, still being able to operate with lean combustion and meeting emission demands.

Thus the invention allows operation in a broader range of loads.

The similar effect appears in case of low ambient temperatures. Then the main fluid carries a higher mass flow and more $O_2$ content, thus the fuel-to-air ratio decreases. Thus, if then the valve 40 is continuously opened, then a reverse flow occurs through the effusion opening 48 and the passage 50. The effect is the same as explained before, the temperature of the fluid provided to the combustor rises, the mass flow reduces. Overall, the combustion temperature rises due to an increased fuel-to-air ratio. CO emissions will be reduced. Thus the invention allows operation in a broader range of ambient temperatures.

Note that the bleed valve 60 typically may be closed during steady operation. The bleed valve 60 nevertheless may be opened for startup or transient operation.

The recirculation of fluid may "fill up the compressor stages" so less "fresh air" can enter the compressor which in consequence reduces the air (and oxygen) flow to the combustors. There typically will also be a new balance point for the gas turbine engine which implies lower efficiency and less air flow and consequently higher combustion temperature for the same engine output.

FIG. 2 shows a similar embodiment as FIG. 1, but shows a slightly different embodiment of the cavity 30 and shows some more details compared to FIG. 1. Nevertheless, all previously indicated components and its reference symbols are used again in FIG. 2, so that same components with same reference symbols are not explained a second time. The previous explanation applies for all figures.

According to FIG. 2, besides the already introduced passage 50 and cavity 30, a second bleed cavity 121 is shown, in fluid communication with a second bleed opening 120. This second bleed cavity 121 may be present for startup of the engine or to extract cooling fluid to be used for cooling a component of the turbine section. A possibly needed piping and valve for the bleed cavity 121 is not shown in FIG. 2.

In FIG. 2 the effusion opening 48 between the side branch chamber 70 and the cavity 30 is shown in more detail but still in an abstract way. Located within the effusion opening 48, a valve 40 is positioned. One part of the valve may be formed as a conical section 43 which can block a corresponding cylindrical or conical opening 44 of the effusion opening 48. The valve 40 is positioned at the wall 72 between side branch chamber 70 and cavity 30. The valve position, which possibly can change its longitudinal position in the cylindrical or conical opening 44 can be controlled via a first actuator 42. In the depiction the first actuator 42 operates a rod to which the conical section 43 of the valve 40 is attached.

It has to be noted that the cavity 30 is located between two walls, a wall of the casing 62 and a radially inner wall that is present, for example, to mount the vanes 17 and to provide the outer boundary wall 12.

In between the cavity 30 and the second bleed cavity 121 there may be a separator wall with no passage for separation of these cavities.

Figure 3:
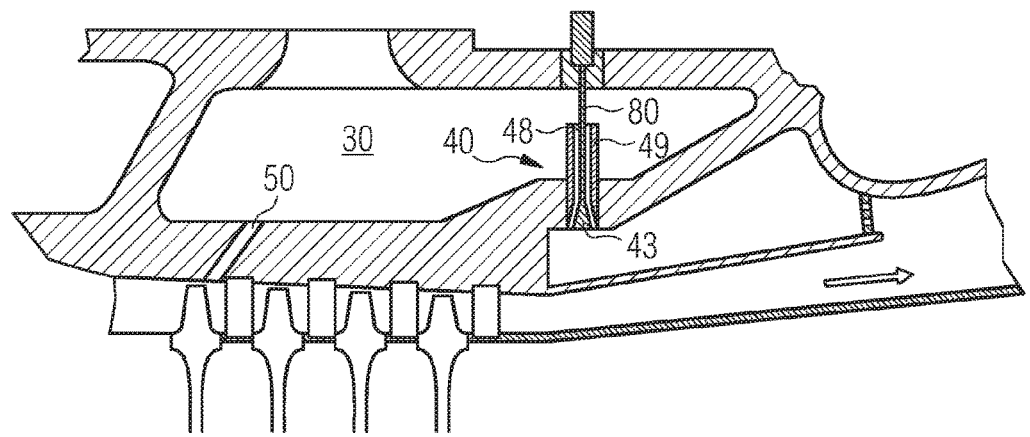
FIG. 3: shows an embodiment of the invention with a first valve implementation.
Figure 4:
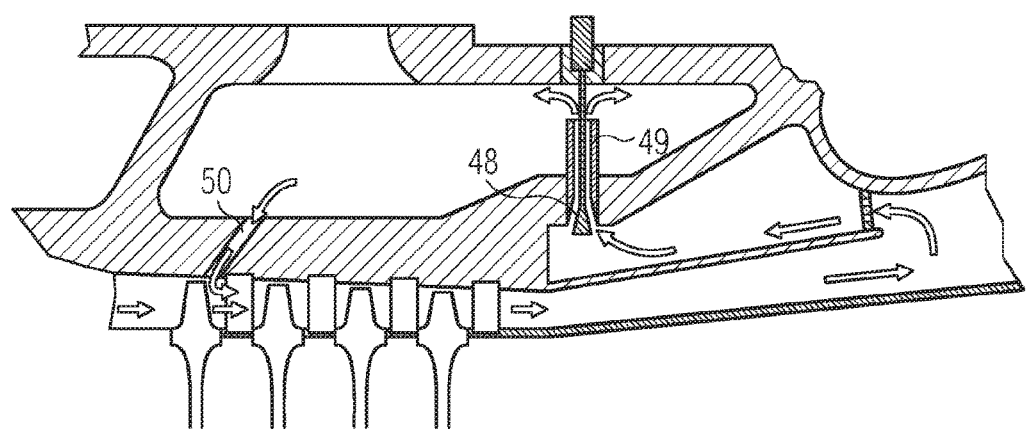
FIG. 4: shows the same embodiment as FIG. 3 of the invention with a first valve implementation, in another mode of operation.

FIGS. 3 and 4 now show a section of the compressor with a first configuration of a valve, similar to the one that was disclosed previously.

The valve 40 comprises a sleeve 49 with a cylindrical section and an outer conical section. The sleeve 49 defines the previously mentioned cylindrical or conical opening 44. The moving part of the valve 40 comprises a rod 80 to which the conical section 43 is attached. The conical section 43 is an inner cone that perfectly matches the outer conical opening 44. FIG. 3 indicates a closed position of the valve 40 with no fluid flow through the effusion opening 48. Also no flow is present through the passage 50. Further, no flow is occurring through the flow equalizer plate 71.

Thus, FIG. 3 shows a mode of operation in which the invention is deactivated, e.g. when operated under full load or when temperature of ambient air is sufficiently high so that emission are not exceeding given limitations.

FIG. 4 now shows the same configuration if the valve 40 is opened. By arrows a fluid flow is indicated, particularly through the flow equalizer plate 71, through the effusion opening 48 and through the passage 50. This generates a recirculation of compressor fluid leading to as explained before in detail less emissions in the combustion process in the case of part or low load operation and/or in the case of elevated ambient air temperature.

Figure 5:
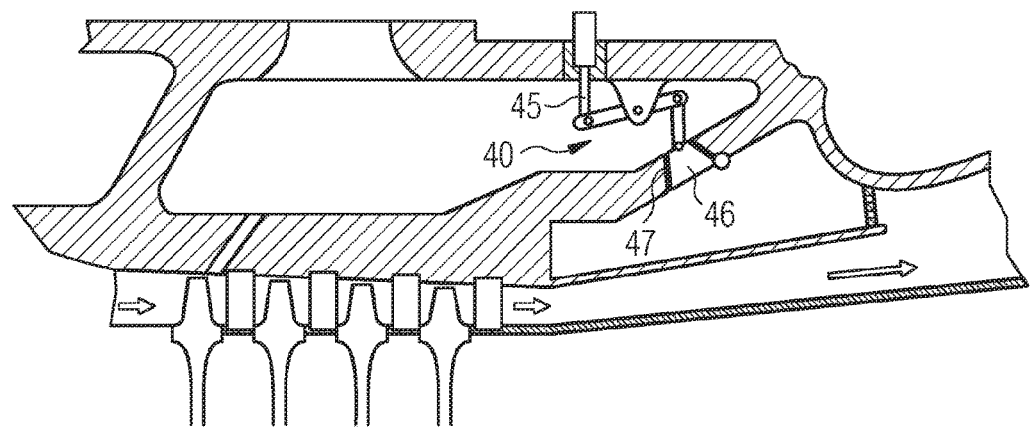
FIG. 5: shows an embodiment of the invention with a second valve implementation.
Figure 6:
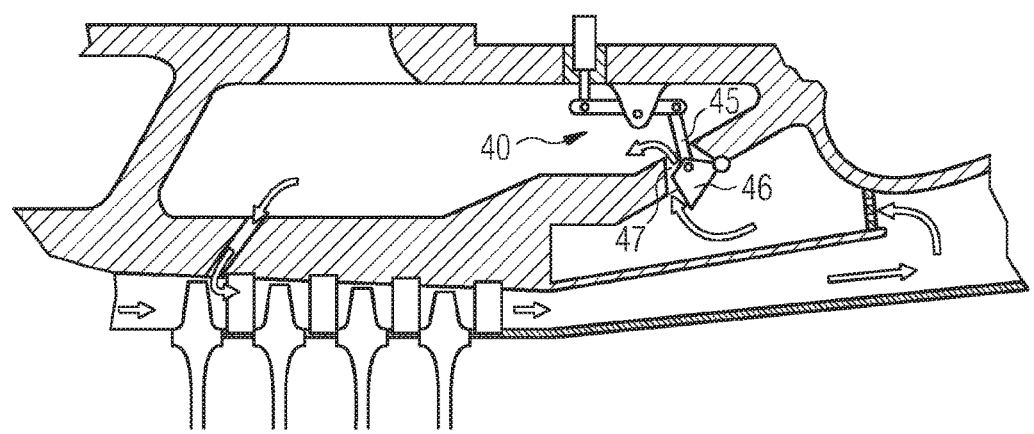
FIG. 6: shows the same embodiment as FIG. 5 of the invention with a second valve implementation, in a another mode of operation.

FIGS. 5 and 6 show the same principle for a different valve design. In this case the valve 40 comprises a flap 46. The flap closes an opening 47, which represents the effusion opening 48. A second actuator 45 is present to act upon the flap 46. The second actuator 45 may comprise a number of rods or levers. Additionally the flap 46 may be fixed to a pivoting point about which the flap 46 can turn.

One surface of the flap 46 may have a form that corresponds directly to a surface of the opening 47. Both may be conical. By this, the opening 47 can be completely closed (see FIG. 5 with no fluid flow) or opened (see FIG. 6 with a fluid flow indicated by arrows).

A control entity may control the position of the movable part of the valve 40, e.g. the flap 46.

The given example of FIG. 3 to FIG. 6 may be advantageous if the invention is to be retrofitted to an existing gas turbine engine, in which a probe entry is present, e.g. to allow temperature measurements. This probe entry may be equipped with the proposed valve 40 and its actuators (42 and 45). For a new designed gas turbine engine, different valves may be advantageous. For example a full ring may be turned or moved allowing to close an annular opening, if the opening 44 or 47 or the effusion opening 48 are not just holes of a limited size but annular slots that are covered by the ring.

To summarize, the invention provides a solution to generate a richer mixture and a combustion with higher temperatures. This can be used for low and part load operation so to extend the range of acceptable loads meeting required emission demands. The combustion or cycle efficiency will improve. This is special as intentionally the compressor operation will be modified such that the compressor operation is worse in efficiency as hotter air in the compressor will reduce its efficiency as less $O_2$ can be delivered. Nevertheless the combustion efficiency may improve instead.

The invention is particularly to be designed for stable and/or continuous and/or constant and/or permanent and/or non-transient operation (these terms are supposed to define the same state of operation within this invention), not particularly for startup or transients. Thus, an opened valve 40 is also a continuous setup, not only a short term configuration to avoid failures.

Even though not primarily intended for, the invention may also be used for startup or transients, if needed.

For example, in transient or non-transient operation, the extraction point at the downstream sub section 15 of the compressor or at a subsequent transition piece 20 allows extraction of high pressure fluid of elevated temperature that can be used to extract from the cavity 30 via the bleed valve 60 to be used—alone or in combination of the recirculation—for anti-icing of a compressor inlet or other components If on the other hand the effusion opening 48 is closed by the valve 40, cooler fluid of less pressure can be extracted via the passage 50. This extracted fluid can then be passed via bleed valve 60 to another components for cooling purposes.

Thus, the arrangement can be used for different needs during operation of a compressor or gas turbine arrangement.

It has to be noted every change in a compressor or turbine may give a new balance point of the gas turbine. Thus some of the explanations of the advantages above may be a slight simplification. When the "recirculation" feature is activated, rotor speed, airflow, air temperature and/or compressor efficiency may change and through that more fuel may be needed to keep the power demand. Consequently the flame temperature in the combustor will increase, as intended.

The invention claimed is:

1. A compressor arrangement of a gas turbine engine, comprising:
    a main compressor section comprising an inner boundary wall and an outer boundary wall that define therebetween a main fluid path through the main compressor section, and a second outer wall surrounding the outer boundary wall, the main compressor section comprising a plurality of rows of blades and a plurality of rows of vanes and being segmented into an upstream sub section and a downstream sub section, each comprising at least one row of blades and at least one row of vanes arranged within the main fluid path;
    a transition piece located downstream of the plurality of rows of blades of the main compressor section, the transition piece comprising further boundary walls of the main fluid path through the transition piece;
    a cavity between the outer boundary wall and the second outer wall and comprising an annular shape;
    an effusion opening that opens directly into the cavity and connects the downstream sub section or the transition piece and the cavity;
    at least one valve to control effusion of compressor fluid from the main fluid path into the cavity via the effusion opening during operation;
    a passage that opens directly into the cavity and connects the cavity and the main compressor section to guide fluid between the cavity and the main fluid path of the main compressor section during operation, wherein the passage is located between the upstream sub section and the downstream sub section and located at least one row of blades and at least one row of vanes upstream of the effusion opening;
    a bleed valve arranged in a bleed duct which diverts from the cavity:
        (a) wherein the compressor arrangement is configured to operate in a normal mode of operation, wherein the passage, in a closed position of the at least one valve and an open position of the bleed valve, is arranged to provide a flow of fluid from the main fluid path into the cavity,
        (b) wherein the compressor arrangement is configured to operate in an additional mode of operation, wherein the passage, in the closed position of the at least one valve and a closed position of the bleed valve, is arranged to provide no flow of fluid, and
        (c) wherein the compressor arrangement is configured to operate in a first mode of operation, wherein the passage, in an opened position of the at least one valve and the closed position of the bleed valve, is arranged to provide a flow of fluid from the cavity into the main fluid path at a location upstream of the effusion opening, and
    a control entity to perform at least the following steps during operation:
    measure a combustion temperature or at least one physical parameter indicative for the combustion temperature;
    compare the measured combustion temperature or the at least one physical parameter with a lower threshold value and open the at least one valve if the measured combustion temperature is below the lower threshold value, and/or
    compare the measured combustion temperature or the at least one physical parameter with an upper threshold value and close the at least one valve if the measured combustion temperature is above the upper threshold value.

2. The compressor arrangement according to claim 1, wherein the upstream sub section and/or the downstream sub section at least comprises three rows of blades.

3. The compressor arrangement according to claim 1, wherein the cavity is radially surrounded by a casing of the gas turbine engine, wherein the casing provides an opening to the cavity.

4. The compressor arrangement according to claim 1, wherein one of the at least one valve comprises a first actuator, a conical section that can be longitudinally adjusted by the first actuator, and wherein the effusion opening comprises a substantially cylindrical or conical opening for guiding the fluid through the opening,
    wherein the conical section, if longitudinally adjusted by the first actuator, can close, restrict or open a fluid passage between the conical section and the effusion opening during operation.

5. The compressor arrangement according to claim 1, wherein one of the at least one valve comprises a second actuator, a flap that can be turned by the second actuator, and the effusion opening,
    wherein the flap can close or open a fluid passage between the flap and the effusion opening during operation.

6. The compressor arrangement according to claim 5, wherein the second actuator is installed in a probe opening of the gas turbine engine provided for temporary installation of a probe.

7. The compressor arrangement according to claim 1, wherein one of the at least one valve is positioned at the further boundary walls of the main fluid path of the transition piece or at a wall of a side branch chamber connected to the main fluid path.

8. The compressor arrangement according to claim 7, wherein a fluidic connection between the side branch chamber and the main fluid path is provided via a flow equalizer plate.

9. A gas turbine engine,
wherein the gas turbine engine comprises a compressor arrangement as defined according to claim 1.

10. A method of operation of the compressor arrangement to reduce emissions in non-transient low load conditions, wherein the compressor arrangement is defined according to claim 1, the method comprising:
controlling the at least one valve to adapt the effusion of compressor fluid from the main fluid path into the cavity via the effusion opening, and
reducing emissions in non-transient low load conditions.

11. The compressor arrangement of claim 1, wherein the effusion opening connects the transition piece to the cavity.

12. A compressor arrangement of a gas turbine engine, comprising:
a main compressor section comprising an inner boundary wall and an outer boundary wall that define therebetween a main fluid path through the main compressor section, the main compressor section comprising a plurality of rows of blades and a plurality of rows of vanes and being segmented into an upstream sub section and a downstream sub section, each comprising at least one row of blades and at least one row of vanes arranged within the main fluid path;
a transition piece located downstream of the plurality of rows of blades of the main compressor section, the transition piece comprising further boundary walls of the main fluid path through the transition piece;
a cavity between the outer boundary wall and an exterior casing of the gas turbine engine and comprising an annular shape;
an effusion opening that opens directly into the cavity and connects the downstream sub section or the transition piece to the cavity;
at least one valve to control effusion of compressor fluid from the main fluid path into the cavity via the effusion opening during operation; and
a passage that opens directly into the cavity and connects the cavity and the main compressor section to guide fluid between the cavity and the main fluid path of the main compressor section during operation, wherein the passage is located between the upstream sub section and the downstream sub section and located at least one row of blades and at least one row of vanes upstream of the effusion opening,
wherein the compressor arrangement is configured to operate in a first mode of operation, wherein the passage, in an opened position of the at least one valve, is arranged to provide a flow of fluid from the cavity into the main fluid path at a location upstream of the effusion opening; and
a control entity to perform at least the following steps during operation:
measure a combustion temperature or at least one physical parameter indicative for the combustion temperature;
compare the measured combustion temperature or the at least one physical parameter with a lower threshold value and open the at least one valve if the measured combustion temperature is below the lower threshold value, and/or
compare the measured combustion temperature or the at least one physical parameter with an upper threshold value and close the at least one valve if the measured combustion temperature is above the upper threshold value.

13. The compressor arrangement of claim 12, wherein the compressor arrangement is configured to operate in a second mode of operation, wherein the passage, in a closed position of the at least one valve, is arranged to provide no flow of fluid from the main fluid path into the cavity.

14. The compressor arrangement of claim 12, wherein the compressor arrangement is configured to operate in a third mode of operation, wherein the passage, in a closed position of the at least one valve, is arranged to provide a flow of fluid from the main fluid path into the cavity.

* * * * *